(12) United States Patent
Yu et al.

(10) Patent No.: US 12,309,425 B2
(45) Date of Patent: May 20, 2025

(54) DECODING METHOD, INTER-VIEW PREDICTION METHOD, DECODER, AND ENCODER

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Chuchu Wang, Dongguan (CN); Sicheng Li, Dongguan (CN); Zhihuang Xie, Dongguan (CN); Zhenyu Dai, Dongguan (CN)

(73) Assignees: ZHEJIANG UNIVERSITY, Hangzhou (CN); GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 52 days.

(21) Appl. No.: 18/205,662

(22) Filed: Jun. 5, 2023

(65) Prior Publication Data

US 2023/0328282 A1 Oct. 12, 2023

Related U.S. Application Data

(63) Continuation of application No. PCT/CN2020/136209, filed on Dec. 14, 2020.

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/167* (2014.11); *H04N 19/172* (2014.11)

(58) Field of Classification Search
CPC .. H04N 19/105; H04N 19/167; H04N 19/172; H04N 19/176; H04N 19/597
(Continued)

(56) References Cited

U.S. PATENT DOCUMENTS 10,924,747 B2 2/2021 Kim
2011/0261050 A1\* 10/2011 Smolic .................... G06T 15/20
345/419

(Continued)

FOREIGN PATENT DOCUMENTS

CN 101309411 A 11/2008
CN 102413332 A 4/2012
(Continued)

OTHER PUBLICATIONS

Morvan Y et al: "System architecture for free-viewpoint video and 3D-TV", IEEE Transactions on Consumer Electronics, IEEE Service Center, New York, NY, US, vol. 54, No. 2, May 1, 2008 (May 1, 2008), pp. 925-932, XP011229985, ISSN: 0098-3063, DOI: 10.1109/TCE.2008.4560180, the whole document. 8 pages.
(Continued)

*Primary Examiner* — Behrooz M Senfi
(74) *Attorney, Agent, or Firm* — BAYES PLLC

(57) ABSTRACT

A decoding method, a decoder, and an encoder are provided. A view synthesis technology is used to obtain, according to a reference view image, a synthesized image of a view to be encoded, comprising a texture image and a depth image, and a hole filling technology is used to predict hole area information and perform hole filling on the synthesized image of said view to obtain a predicted image.

20 Claims, 8 Drawing Sheets

(51) Int. Cl.
 H04N 19/167 (2014.01)
 H04N 19/172 (2014.01)
(58) Field of Classification Search
 USPC .................................................. 375/240.12
 See application file for complete search history.

(56) References Cited

U.S. PATENT DOCUMENTS

| | | | | |
|---|---|---|---|---|
| 2013/0287289 | A1* | 10/2013 | Tian | H04N 19/553 |
| | | | | 382/154 |
| 2018/0249164 | A1* | 8/2018 | Kim | H04N 19/597 |
| 2020/0137382 | A1* | 4/2020 | Zhao | H04N 13/282 |

FOREIGN PATENT DOCUMENTS

| | | | |
|---|---|---|---|
| CN | 103873867 A | 6/2014 | |
| CN | 106210722 A | 12/2016 | |
| CN | 110313181 A | 10/2019 | |
| WO | WO-2019001710 A1 * | 1/2019 | ........... H04N 13/111 |

OTHER PUBLICATIONS

Gao Yu et al: "Encoder-Driven Inpainting Strategy in Multiview Video Compression", IEEE Transactions on Image Processing, IEEE, USA, vol. 25, No. 1, Jan. 1, 2016 (Jan. 1, 2016), pp. 134-149, XP011594013, ISSN: 1057-7149, DOI: 10.1109/TIP.2015.2498400, the whole document. 16 pages.

Lim Heoun-Taek et al: "Learning based hole filling method using deep convolutional neural network for view synthesis", Electronic Imaging, vol. 28, No. 14, Feb. 14, 2016 (Feb. 14, 2016), pp. 1-5, XP093003167, DOI: 10.2352/ISSN.2470-1173.2016.14. IPMVA-376, the whole document. 5 pages.

Sean Martin: "View Synthesis in Light Field Volume Rendering Using Convolutional Neural Networks", Master Thesis, Aug. 1, 2018 (Aug. 1, 2018), pp. 1-41, XP055702990, Dublin, Ireland, section 3.3.4, 2. 52 pages.

Li Chao et al: "Innovative hole-filling method for depth-image-based rendering (DIBR) based on context learning", Proceedings of SPIE; [Proceedings of SPIE; ISSN 0277-786X; vol. 8615], SPIE, 1000 20th St. Bellingham WA 98225-6705 USA, vol. 10817, Nov. 6, 2018 (Nov. 6, 2018), pp. 1081706-1081706, XP060114178, DOI: 10.1117/12.2500779, ISBN: 978-1-5106-2099-5, the whole document. 5 pages.

Supplementary European Search Report in the European application No. 20965349.2, mailed on Feb. 21, 2024. 13 pages.

International Search Report in the international application No. PCT/CN2020/136209, mailed on Sep. 13, 2021.

Written Opinion of the International Search Authority in the international application No. PCT/CN2020/136209, mailed on Sep. 13, 2021.

\* cited by examiner

DECODING METHOD, INTER-VIEW PREDICTION METHOD, DECODER, AND ENCODER

CROSS-REFERENCE TO RELATED APPLICATION

This application is a continuation of International Application No. PCT/CN2020/136209, filed on Dec. 14, 2020, which is hereby incorporated by reference in its entirety.

TECHNICAL FIELD

Embodiments of the present application relate to the field of video processing technologies, and particularly to a decoding method, a decoder, and an encoder.

BACKGROUND

It is an arduous task faced by researchers about how to display a satisfactory three-dimensional (3D) effect under limited bandwidths. For different 3D display technologies, different 3D data formats are used, that is, different 3D coding methods are used. However, goals of all methods are same, that is, effectively removing temporal redundancy and spatial redundancy between videos to be encoded. Common 3D video coding methods generally include the following categories: a coding method based on multi-view texture, a coding method based on multi-view texture plus depth (i.e., video plus depth), a coding method based on single-view texture plus depth, etc. Depth information of a view reflects a distance between an object in the view and a camera, and the difference of the depth information can reflect the variation of parallaxes.

In multi-view video coding, multi-view texture videos and corresponding depth videos obtained under different camera positions are input. Each view can be represented by a view ID. For example, a view with a view ID of 0 represents a base view (also referred to as an independent view). The base view can be encoded independent of other views by traditional video coding tools without using other views as reference. Other views are called non-base views (also referred to as dependent views), which can be encoded by extended 3D video coding tools to make them more conducive to the multi-view coding. For example, information of a current coding view can be predicted by using information of coded base views, thus reducing redundancies between views and improving the coding efficiency. At a decoding side, a required virtual view picture may be generated using coded video information and the corresponding depth information via a view synthesis technology, such as performing projection transformation and interpolation in the three-dimensional space based on the Depth Picture Based Rendering (DIBR) technology. Herein, extended technologies mainly include disparity compensation prediction, inter-view motion prediction and inter-view redundancy prediction.

In related art, a same inter-view motion prediction disparity vector is used for all blocks of a picture. However, in fact, when the view moves, holes will appear since the displacement of a block is different from that of another block. Or, because shield relationships exist between objects in the three-dimensional space, when projecting from a coded view to reference views located at other locations, new regions will be exposed from the new perspective, and those unknown information that has not been captured will also form holes. These holes will reduce the quality of video encoding/decoding.

SUMMARY

The following is an overview of the subject-matters described in detail in the present application, which is not intended to limit the protection scope of the claims.

The present application provides a decoding method, an inter-view prediction method, a decoder and an encoder.

An embodiment of the present application provides a method for decoding.

The method includes the following operations.

A first picture of a view to be processed is generated according to a texture picture and a depth picture of a reference view obtained by decoding.

A hole in the first picture is filled according to relevant information, related to a picture, of the generated first picture, to obtain a second picture of the view to be processed.

A decoded picture is generated according to the second picture and obtained residual data.

An embodiment of the present application provides a decoder. The decoder includes a memory for storing instructions and a processor, the instructions, when executed by the processor, cause the processor to perform operations of any one of the above-mentioned decoding method.

An embodiment of the present application provides an encoder. The encoder includes a memory for storing computer executable instructions and a processor, the instructions, when executed by the processor, cause the processor to generate a first picture of a view to be encoded according to a picture of an encoded reference view taken at a same moment as a picture of the view to be encoded; and fill, according to relevant information of the generated first picture of the view to be encoded, a hole in the first picture of the view to be encoded, to obtain a second picture of the view to be encoded.

Other features and advantages of embodiments of the present application will be set forth in the following description and will become apparent in part from the description, or will be understood from the practice of the present application. The aim and other advantages of the present application may be realized and obtained by the structure particularly pointed out in the appended drawings, the claims and the description.

After reading and understanding the drawings and detailed description, other aspects can be understood.

BRIEF DESCRIPTION OF THE DRAWINGS

The drawings described herein are used to provide a further understanding of the application and form a part of the application. The schematic embodiments of the application and the description thereof are used to explain the application and do not constitute an improper limitation of the application, wherein.

DETAILED DESCRIPTION

The application will be described in detail below with reference to the appended drawings and in combination with embodiments. It should be noted that the embodiments in the present application and the features in the embodiments can be combined with each other without conflict.

Multi-view videos are a set of video sequences obtained by shooting a same scene with an array of cameras at different locations in space, in which there are a mass of inter-view redundancy and temporal redundancy. In addition to eliminating intra-view temporal redundancy and spatial redundancy using methods typically used for a 2D video, inter-view spatial redundancy should also be eliminated. Predictive coding is widely used in Multi-view Video Coding (MVC) in the related art, thus predictive coding technologies are an important aspect of MVC. With a reasonable prediction method, the inter-view spatial redundancy of videos from all channels for views can be effectively removed, to achieve high compression efficiency.

Figure 1:
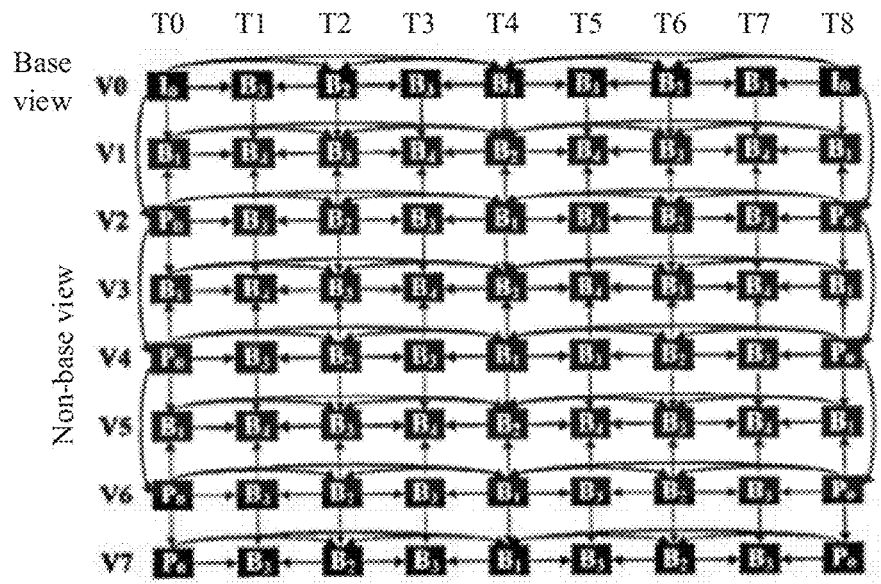
FIG. 1 is a schematic diagram of a predictive coding structure in which inter-view prediction based on hierarchical B pictures is combined with time domain prediction in the related art.

In order to obtain higher picture quality, a block is segmented into 16×16, 16×8, 8×16, 8×8 pixels based on a Hierarchical B Picture (HBP) structure. Herein, 8×8 pixels can be further segmented. Generally, a large block segmentation mode is suitable for coding regions with a simple and uniform texture or regions with slow motion, while a small block segmentation mode is suitable for compressing and coding regions with a complex texture or regions with fast motion. As shown in FIG. 1, in a predictive coding structure in which the inter-view prediction based on the HBP is combined with the temporal prediction, the length of a Group of Pictures (GOP) at each view is 8. For each view, a HBP structure is used for time domain prediction, and an inter-view prediction structure is used for view prediction As shown in FIG. 1, V0 is the base view, only the time domain prediction can be used but the inter-view prediction cannot be used. Other views are non-base views, both the time domain prediction and the inter-view prediction can be used. The inter-view prediction is used only for key frames of V2, V4 and V6, while the inter-view prediction can be used for both key frames and non-key frames of V1, V3, V5 and V7.

Figure 2:
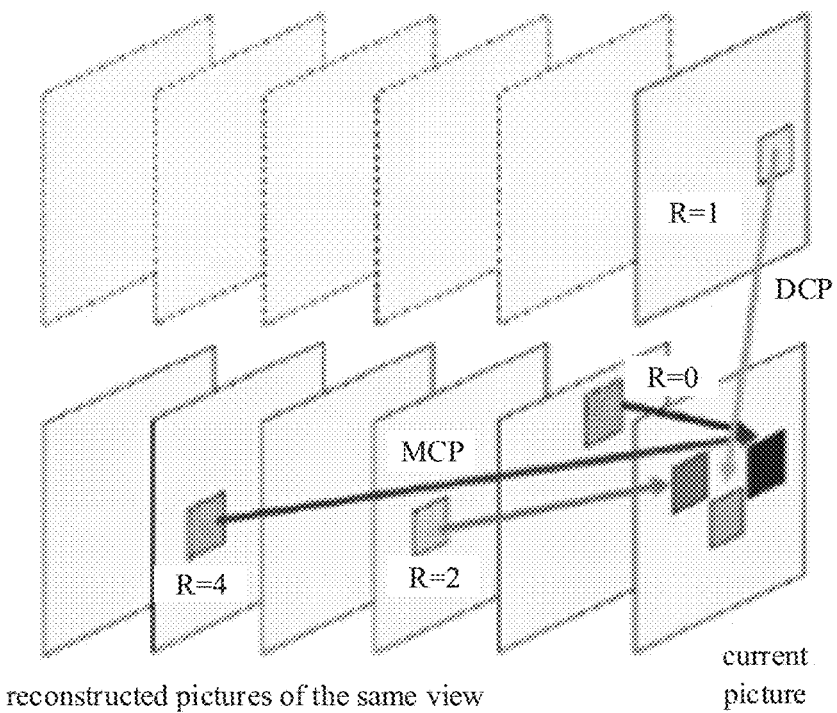
FIG. 2 is a schematic diagram of disparity compensation prediction and motion compensation prediction in the related art.

In addition to the inter-view motion prediction mentioned above, the inter-view disparity estimation may be used to eliminate the inter-view spatial redundancy. The disparity refers to a displacement between two projection points of a same spatial point on different picture planes. A vector which points from one Prediction Unit (PU) of the current frame to another PU in an inter-view reference frame is called a disparity vector. The disparity vector may be used to indicate a position of a respective block, for which the inter-view motion prediction and the inter-view residual prediction are performed, in the inter-view reference frame. The inter-view prediction is used to perform the prediction in the adjacent view for an object in the current view based on the disparity estimation, and a disparity of an object between two views can be determined by the distance between cameras and the object. Disparity Compensated Prediction (DCP) is an important coding technology in view-dependent coding technologies. Disparity compensation and motion compensation refer to a similar concept, which can be understood as a method of inter-frame prediction. Both the disparity estimation algorithm and the motion estimation in the traditional single-view video coding are realized using a block-based searching method. However, there are essential differences between a reference frame for the DCP and a reference frame for the Motion compensated prediction (MCP). The reference frame for the MCP is encoded frames of a same view at different times, while the DCP refers to encoded frames from different views at a same time. Because of the similarity between the DCP and the MCP, the DCP is added into a MCP list as a prediction mode for the MCP. As shown in FIG. 2, the picture index (R value) is referenced to distinguish the MCP from the DCP. For example, R=1 represents the DCP, and the remaining values of R represent the MCP.

Because the multi-view videos are videos shot by multiple camera devices from different angles at the same moment and same scene, motions of objects presented from different views are similar, so motion information of a current view can be predicted from motion information of an encoded view at the same moment. In the related art, in one inter-view motion prediction method, constant disparity vectors are used for all blocks of a picture. The disparity vector can be obtained by the block estimation method and the block matching method. In a disparity vector acquisition method based on adjacent blocks, the positions of the candidate spatial and temporal coding blocks are searched according to a preset order, to determine whether disparity vector information is contained, so as to obtain the disparity vector of the current block. In order to more effectively determine the relationship between the current block and the corresponding block in the reference view and improve the coding quality, depth picture information may be used to predict the relationship between the current view and the reference view more accurately. The disparity vector of the block is obtained from the maximum depth value which is sampled from depths in the related depth blocks.

Figure 3:
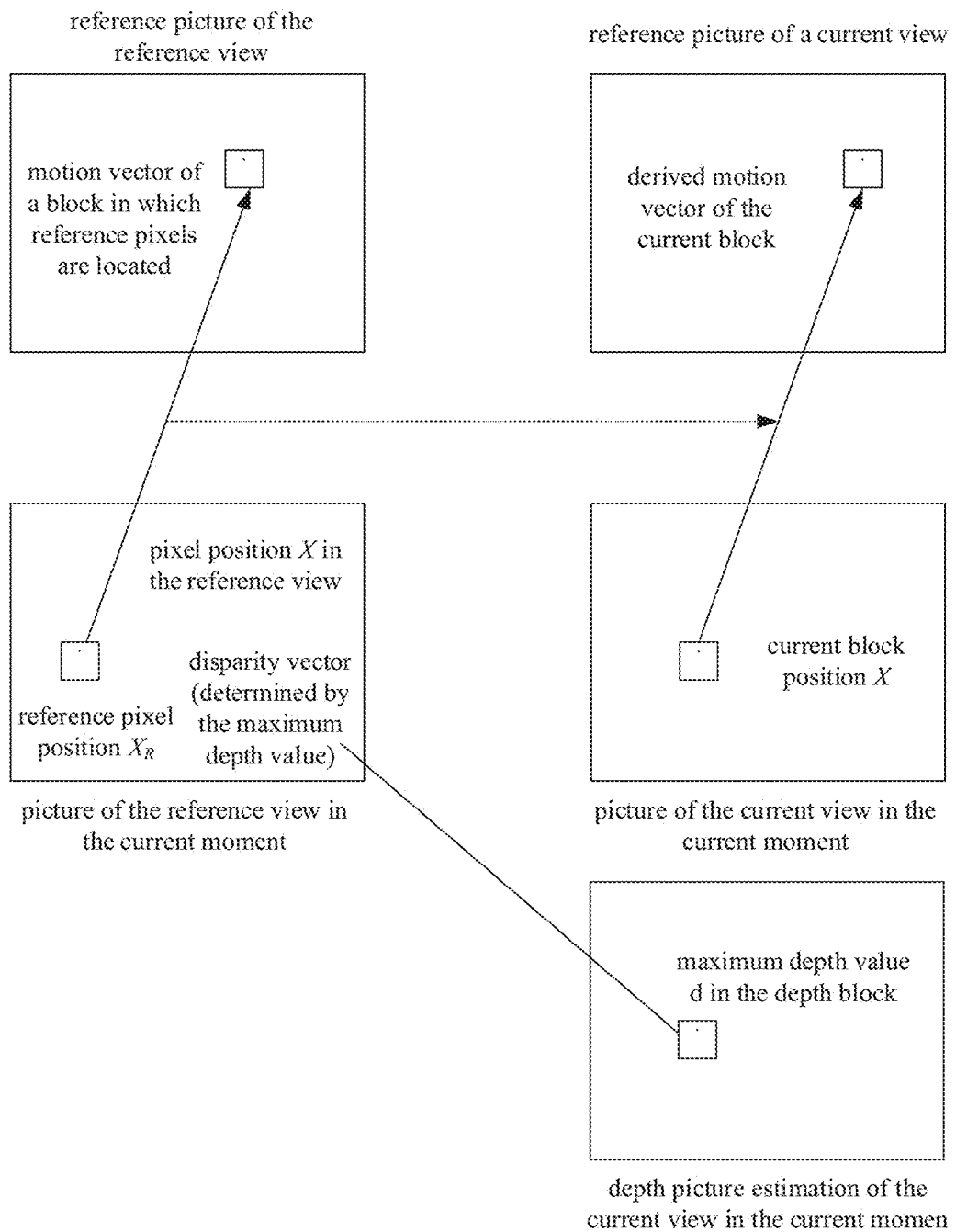
FIG. 3 is a schematic diagram of generating motion parameters of a current encoding view based on motion parameters of a reference view in the related art.

As shown in FIG. 3, it is assumed that the depth picture of the current picture is known (i.e. which is given or can be estimated), the maximum depth value in the current encoded block is converted into a disparity vector. The position XR in the reference view can be obtained by adding the obtained disparity vector to the center position X of the current coding block. If the position XR is encoded using the MCP, then, the motion vector of the block corresponding to the position XR can be used as a reference for the motion information of the coding block in the current view. Similarly, the disparity vector derived from the maximum depth value of the current block can be used for the DCP.

In order to utilize the inter-view redundancy information, flag information can be added to syntax elements between the coded blocks to indicate whether the prediction block utilizes the inter-view redundancy prediction. The inter-view redundancy prediction process is similar to the inter-view motion vector prediction process, which roughly includes: firstly, the disparity vector is transformed from the maximum depth; then, the position in the reference view is determined according to the disparity vector, to obtain the redundancy information of the position; finally, the difference between the redundancy of the current block and the predicted redundancy is coded. If the redundancy information is based on sub-pixels, then interpolating and filtering processes are performed on the redundancy information of the reference view.

Figure 4A:
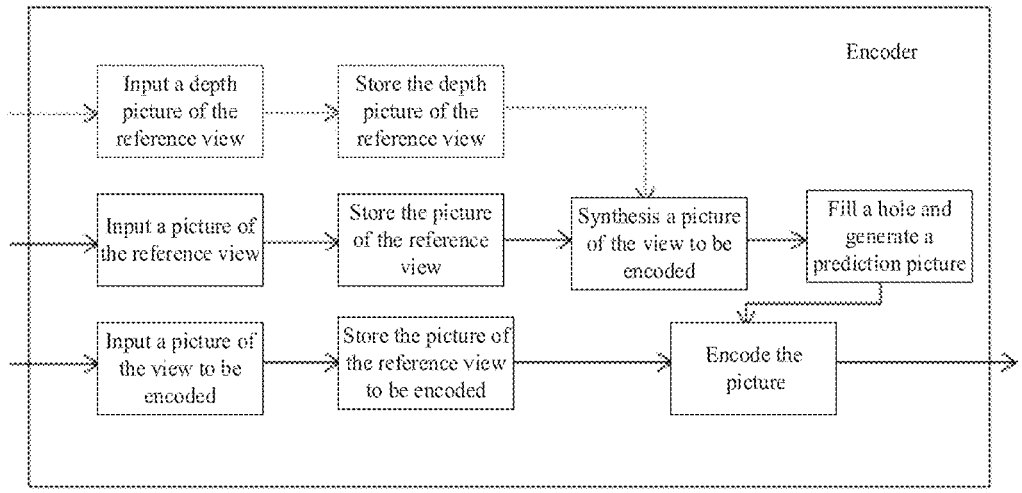
FIG. 4(a) is a schematic diagram of a composition structure of a encoder principle architecture in an embodiment of the present application.
Figure 4B:
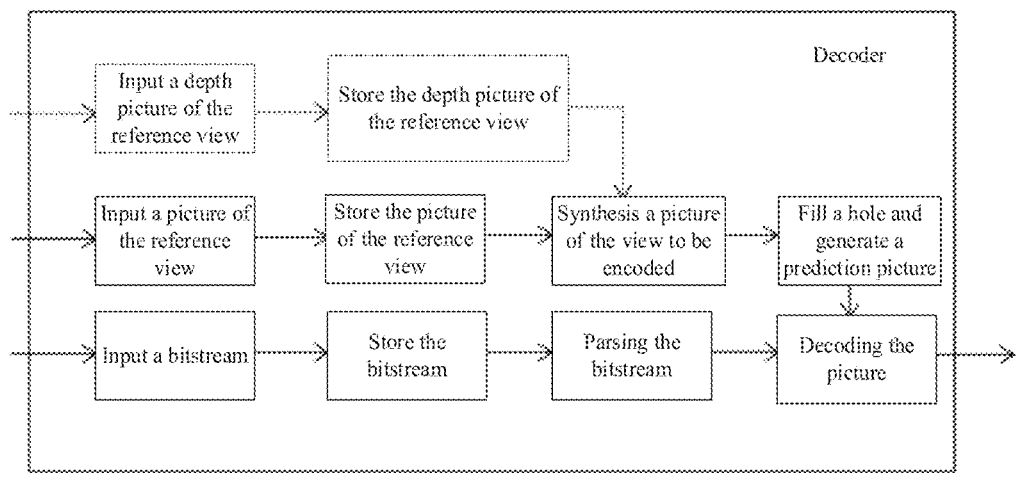
FIG. 4(b) is a schematic diagram of a composition structure of a decoder principle architecture in an embodiment of the present application.

In practical application, the inventor of the present application found that, for most of the inter-view prediction in the related art, the prediction is performed based on the disparity vector, prediction and compensation are performed in a manner of calculating the offset for each prediction block, which cannot guarantee the decoding quality. In order to improve the quality of encoding/decoding, in a encoder as shown in FIG. 4(*a*) and a decoder as shown in FIG. 4(*b*), modules related to the inter-view prediction according to the present application mainly include: a reference view picture input module and a storage module, a to-be-encoded view synthesis picture module and a hole filling prediction picture generation module. Combined with FIGS. 4(*a*) and 4(*b*), the inter-view prediction method of the present application generally includes the following operations: a picture to be encoded is synthesized according to the reference pictures from the reference view picture input module by the to be encoded view synthesis picture module adopting the view synthesis technique for a prediction block, and hole region information is predicted by the hole filling prediction picture generation module using the hole filling technique, to obtain a complete predicted picture, thereby effectively reducing high frequency components and improving coding efficiency. Furthermore, sudden changes after depth picture differencing is avoided by predicting the hole information of the depth picture, and the depth edge and depth contour are effectively protected, thus ensuring the coding quality. It should be noted that the inter-view prediction method provided by the present application is not limited to the encoder and decoder architectures shown in FIGS. 4(*a*) and 4(*b*).

An inter-view prediction method in an embodiment of the present application includes the following operations. a first picture of a view to be encoded is generated from a picture of an encoded reference view which is shot at the same moment as a picture of the view to be encoded; a hole in the first picture of the view to be encoded is filled according to the relevant information, related to a picture, of the generated first picture of the view to be encoded, to obtain a second picture of the view to be encoded.

Figure 5:
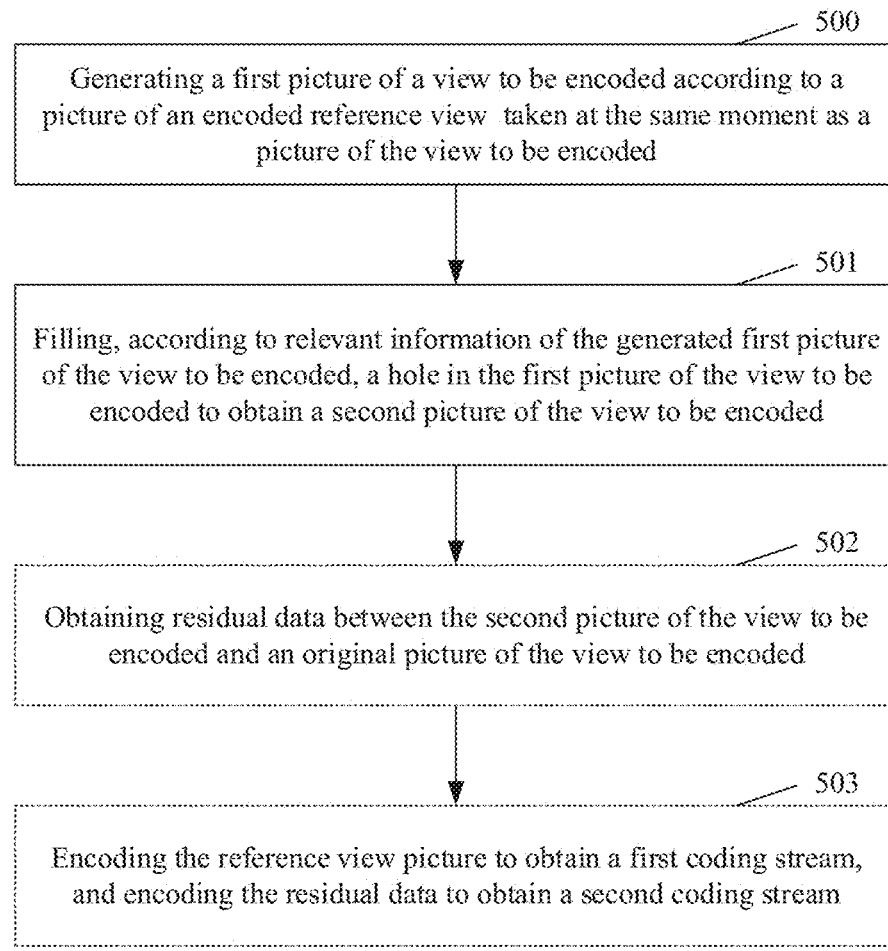
FIG. 5 is a flowchart schematically illustrating an inter-view prediction method in an embodiment of the present application.

FIG. 5 is a flowchart schematically illustrating an inter-view prediction method in an embodiment of the application, as shown in FIG. 5, the method includes Operations 500-503.

In Operation 500, a first picture of a view to be encoded is generated according to a picture of an encoded reference view taken at the same moment as a picture of the view to be encoded.

In an example, the reference view may be any one of a plurality of views other than the view to be encoded.

In an example, before the first picture of the view to be encoded is generated, the method further includes the following operations.

A texture picture of a reference view, a texture picture of the view to be encoded, and internal and external parameters of cameras corresponding to views are obtained, and depth pictures corresponding to the views are estimated from the obtained texture pictures.

Alternatively, a texture picture of a reference view, a texture picture the view to be encoded, depth pictures corresponding to the views and internal and external parameters of cameras corresponding to the views are obtained.

In an example, Operation 500 may specifically include the following operations.

The first picture of the view to be encoded is generated according to a texture picture of the picture of the encoded reference view taken at the same moment as the picture of the view to be encoded, the depth pictures corresponding to the views and the camera parameters corresponding to the view. It should be noted that, when the first picture of the view to be encoded is generated, the depth picture may not be used. The first picture of the view to be encoded at least includes the texture picture of the view to be encoded.

In Operation 501, a hole in the first picture of the view to be encoded is filled according to relevant information of the generated first picture of the view to be encoded, to obtain a second picture of the view to be encoded.

In an example, the relevant information of the first picture of the view to be encoded at least includes texture picture information (denoted by T in the drawings). Then, before the hole in the first picture of the view to be encoded is filled to obtain a second picture of the view to be encoded in Operation 501, the method may further include the following operation.

Depth picture information (denoted by D in the drawings) and/or mask picture information (denoted by M in the drawings) is/are estimated from the texture picture information. The estimation methods include, but are not limited to, binocular stereo matching based on stereo vision, monocular/binocular picture depth estimation based on deep learning, etc.

Here, in order to indicate a hole region in the picture for which the hole filling is required to be performed, each picture for which the hole filling is required to be performed has a corresponding mask picture (also called a hole mask picture). The mask picture can be a binary picture.

In an example, the relevant information of the first picture of the view to be encoded includes the texture picture information and depth picture information. Then, before the hole in the first picture of the view to be encoded is filled to obtain a second picture of the view to be encoded in Operation 501, the method may further include the following operation.

Mask picture information is predicted according to the texture picture information and the depth picture information. For example, according to the analysis of the texture picture and the depth picture, a pixel of which a texture value is 0 is represented as 0 in the mask picture, and a pixels of which the texture value is not 0 is represented as 1 in the mask picture, and these values constitute the mask picture.

In an example, the operation that the hole in the first picture of the view to be encoded is filled to obtain a second picture of the view to be encoded may include the following operations.

The hole in the first picture of the view to be encoded is filled according to the texture picture information in the relevant information of the first picture of the view to be encoded, to obtain the second picture of the view to be encoded.

Alternatively, the hole in the first picture of the view to be encoded is filled according to the texture picture information and the depth picture information in the relevant information of the first picture of the view to be encoded, to obtain the second picture of the view to be encoded.

Alternatively, the hole in the first picture of the view to be encoded is filled according to the texture picture information, the depth picture information and the mask picture information in the relevant information of the first picture of the view to be encoded, to obtain the second picture of the view to be encoded.

Figure 6A:
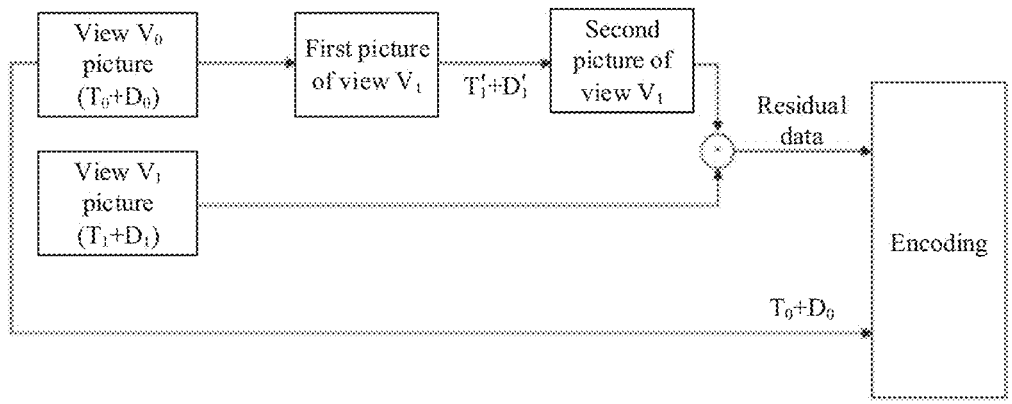
FIG. 6(a) is an exemplary schematic diagram of implementing encoding at the encoding end in an embodiment of the present application.
Figure 6B:
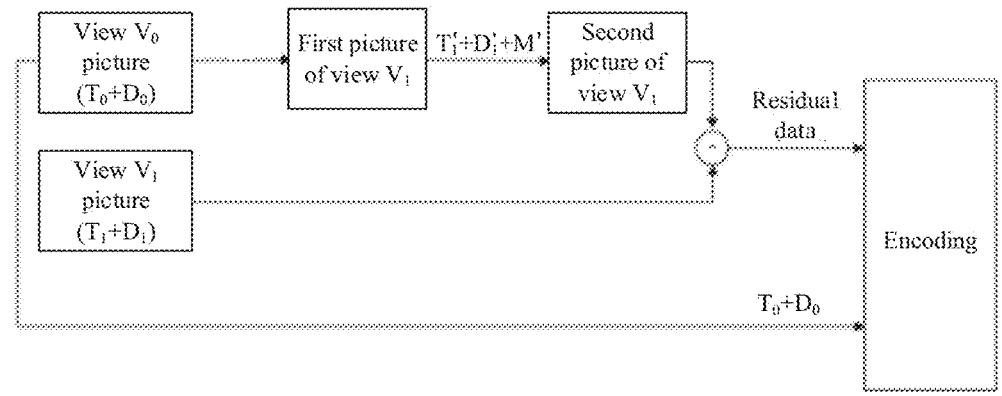
FIG. 6(b) is another exemplary schematic diagram of implementing encoding at the encoding end in an embodiment of the present application.
Figure 6C:
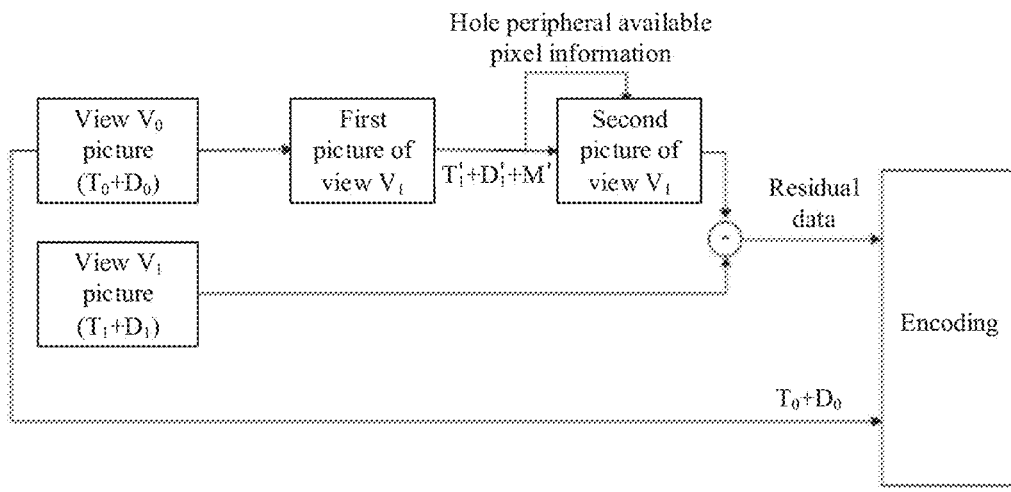
FIG. 6(c) is still another exemplary schematic diagram of implementing encoding at the encoding end in an embodiment of the present application.

Reference is made to FIGS. 6(a)-6(c), a view $V_0$ picture is a reference view picture, a view $V_1$ picture is a view picture to be encoded, a first picture of the view $V_1$ is a first picture of the view to be encoded, and a second picture of the view $V_1$ is a second picture of the view to be encoded. The operation that the hole in the first picture of the view to be encoded is filled to obtain the second picture of the view to be encoded in Operation 501 may include the following operations.

The hole in the first picture of the view to be encoded is filled according to texture picture information ($T'_1$), to obtain the second picture of the view to be encoded. Herein, the filling methods include, but are not limited to, a seed filling algorithm, a polygon ordered edge table filling algorithm, a polygon flag filling algorithm, a filling algorithm based on deep learning (such as a hole filling algorithm based on convolution self-encoding, a hole filling algorithm based on a Generative Adversarial Network (GAN), a hole filling algorithm based on a Recurrent Neural Network (RNN), etc.), a traditional filling algorithm based on diffusion or sample, etc.

Alternatively, as shown in FIG. 6(a), the hole in the first picture of the view to be encoded is filled according to the texture picture information ($T'_1$) and the depth picture information ($D'_1$), to obtain the second picture of the view to be encoded. Herein, the filling methods include, but are not limited to, a filling algorithm based on deep learning, a traditional filling algorithm based on diffusion or sample, etc.

Alternatively, the first picture of the view to be encoded further includes the mask picture, as shown in FIG. 6(b), the hole in the first picture of the view to be encoded is filled according to the texture picture information ($T'_1$), the depth picture information ($D'_1$) and the mask picture information (M'), to obtain the second picture of the view to be encoded. Herein, the filling methods include, but are not limited to, a neural network obtained based on learning of the texture picture, the depth picture, and the mask picture, etc.

It should be noted that when the second picture of the view to be encoded is generated, the depth picture may not be used.

In an example, the hole filling may be performed for an entire prediction block or for a partial region within the prediction block. In an example, the hole filling may further include one of a traditional diffusion-based method, a sample-based method, a network-based method, etc.

The inventor of the present application found that most holes occur around objects with shallow depths. Because of this characteristic of the holes, for the pixels inside the hole, reference may be made to only a part of the pixels around the hole, but reference may not be made to the rest of the pixels around the hole, which may even mislead the results of hole filling. That is to say, only a part of the pixels around the hole should be selected as reference pixels (called a hole peripheral availability template picture herein), and the rest of the pixels around the hole should not be selected as reference pixels. That is to say, the hole peripheral availability template picture includes a set of pixels which is located around the hole and of which pixel values can be referenced by pixels inside the hole.

Thus, in an example, the present application may further include the following operations.

A hole peripheral availability template picture in the first picture of the view to be encoded is generated.

When the hole peripheral availability template picture is generated, the hole template picture and the depth picture for which the hole filling is required to be performed is analyzed, to obtain a reference region that can guide subsequent hole filling operations. Herein, the reference region is represented in a form of a binary mask picture. The purpose of generating the hole peripheral availability template picture is to determine a region that are helpful for the subsequent hole filling operations from the texture picture for which the hole filling is required to be performed.

In an example, the operation of generating the hole peripheral availability template picture in the first picture of the view to be processed may include the following operations.

Connected regions composed of missing pixels are sequentially selected one by one from a mask picture of the hole, that is, hole region analysis, which includes operations that: firstly, the barycenter pixel of the selected hole region is set as the center pixel; then, a texture sub-block picture to be filled, a depth sub-block picture to be filled and a mask sub-block picture, each of which has a preset width and a preset height, such as 512, are intercepted respectively from the texture picture for which the hole filling is required to be performed and the depth picture for which the hole filling is required to be performed by taking the center pixel as a center;

A reference region (also called candidate pixels) that can be used for analyzing availability and located around the hole is acquired, which includes operations that firstly, an expansion operation is performed on the hole region in the mask picture of the hole, to obtain an expanded hole sub-block picture; then, a XOR operation is performed on the expanded hole sub-block picture and the mask sub-block picture of the hole, to obtain the candidate pixels for analyzing availability;

Depth values of the obtained candidate pixels are analyzed, which includes operations that: a depth threshold which can best distinguish depth values of the candidate pixels may be calculated using, for example, an OTSU method; and The depth picture for which the hole filling is required to be performed is segmented using the depth threshold, to obtain the hole peripheral availability template picture, which includes operations that: for example, pixels of which depth values is greater than or equal to the depth threshold in the depth sub-block picture are determined as hole peripheral available pixels, otherwise, pixels of which depth values is less than the depth threshold in the depth sub-block picture are determined as hole peripheral unavailable pixels, so as to obtain the hole peripheral availability template picture.

In an example, the first picture of the view to be encoded further includes the mask picture, and a peripheral available pixel information template picture, as shown in FIG. 6(c). The operation of filling the hole in the first picture of the view to be encoded to obtain a second picture of the view to be encoded in Operation 501 may include the following operations.

The hole in the first picture of the view to be encoded is filled according to the texture picture information ($T'_1$), the depth picture information ($D'_1$), the mask picture information ($M'$) and the information of hole peripheral availability template picture, to obtain a second picture of the view to be encoded.

In an example, the hole filling technique in embodiments of the present application may be any hole filling technique and the specific implementation is not intended to limit the protection scope of the present application.

In an example, the operation of filling the hole in the first picture of the view to be encoded to obtain a second picture of the view to be encoded in Operation 501 may include the following operations.

The hole in the first picture of the view to be encoded is filled using a neural network, to obtain the second picture of the view to be encoded. Herein, the neural network for filling the hole is also called a hole neural network. Specifically, the neural network is used to process the texture picture for which the hole filling is required to be performed, the depth picture for which the hole filling is required to be performed, the mask picture of the hole and the hole peripheral availability template picture, which are included in the first picture of the view to be encoded, to obtain a complete hole filling picture, that is, the second picture of the view to be encoded.

Through the hole filling method in the embodiment of the present application, the hole information of the depth picture is also predicted, the pixels of the missing region are filled, the texture structure consistency is achieved as a whole, the visual reliability is enhanced, the high-frequency residual information at the hole is eliminated, and the depth edge and the depth contour are effectively protected.

It should be noted that the neural network in embodiments of the present application not only uses the texture picture and the mask picture of the hole for which the hole filling is required to be performed as inputs, but also uses the above generated hole peripheral availability template picture as inputs. By utilizing the information provided in the hole peripheral availability template picture, the neural network for filling the hole in embodiments of the present application realizes a more direct and targeted focus on the reference region that are helpful for repair when repairing uncolored region in the texture picture.

In an example, a preset neural network may be trained using hole filling samples to obtain a neural network. The implementation of the network architecture of the neural network of the present application may include, but is not limited to, such as:

The following operations are performed for each hole filling sample.

The picture to be filled and the mask picture of the hole in the hole filling samples are cascaded to obtain a first C channel tensors, where C is an integer$\geq 1$. A element position dot product operation is performed between the hole peripheral availability template picture in the hole filling samples and the first C channel tensor, to obtain a second C channel tensor. The second C channel tensors are inputted into the neural network for convolution processing.

Alternatively, the picture to be filled, the mask picture of the hole and the hole peripheral availability template picture in the hole filling samples are cascaded, to obtain a third C channel tensors, where C is an integer$\geq 1$. The third C channel tensors are inputting into the neural network for convolution processing.

The picture output by the neural network is compared with the real picture in the hole filling sample, and the neural network is continuously trained according to the comparison result.

In the convolution processing, a convolution operation is performed on the hole peripheral availability template picture in the hole filling samples to obtain an availability characteristic map, and the characteristic map obtained by performing the dot product operation on the availability characteristic map and the output characteristic map of the previous M-layer convolution layer in terms of element positions is taken as the input of the previous M+1-layer convolution layer. The value of M is a subset of $\{1, 2, 3 \ldots N-1\}$, N is the number of convolution layers included in the neural network, and N is an odd number$\geq 3$.

In an example, the value of M is $\{1, 2\}$.

In an example, in order to better introduce the hole peripheral availability template picture, the hole peripheral availability template picture and the texture picture for which the hole filling is required to be performed may not be sent to the neural network in a cascade manner, while the hole peripheral availability template may be added to the neural network in the form of attention mechanism.

The attention mechanism may include: 1) performing dot product operation on the hole peripheral availability template and the input tensor of the neural network in terms of elements; 2) performing dot product operation on the availability characteristic map obtained by performing convolution operation in terms of element positions on the hole peripheral availability template and the first and second layer characteristic maps obtained after being processed by the neural network. By adding the hole peripheral availability template to the neural network in the form of attention mechanism, the neural network can explicitly refer to the information of reference region valuable for the hole filling.

In an example, the hole filling technique in embodiments of the present application may also be any rough hole filling method, such as a simple copy of adjacent pixels or the like. A flag can be introduced to determine whether to adopt a high-precision hole filling technology or a rough hole filling method.

In an example, when the hole peripheral availability template picture is generated, if most pixels around the hole are available, for example, reaching a certain threshold, then it represents that it belongs to a depth-uniform region and the flag can be set to 0 to indicate that only a rough hole filling method, such as a simple copy of adjacent pixels, averaging of adjacent pixels, can be used, without requiring a high-precision hole filling technique. Then the residual signal is encoded.

In an example, if part of pixels in the region of the current processing unit in the hole peripheral availability template picture are available and part of pixels in the region of the current processing unit in the hole peripheral availability template picture are unavailable, it represents that it belongs to the foreground background aliasing region, and this part of the hole is more complex and can be further segmented. For a new segmented processing unit, if the flag is 1, a high-precision hole filling technique is performed to predict the hole information, and then the residual signal is encoded. The processing unit includes, but is not limited to, a Coding Unit (CU), a Prediction Unit (PU), etc.

In an example, the method of the present application further includes Operations 502 and 503.

In Operation 502, residual data between the second picture of the view to be encoded and an original picture of the view to be encoded is obtained.

In Operation 503: the reference view picture is encoded to obtain a first coding stream, and the residual data is encoded to obtain a second coding stream.

Encoding can be implemented in a manner that conforms to common coding standards, and the specific implementation is not limited herein.

According to the inter-view prediction method provided by the embodiments of the present application, the view synthesis technology is used to synthesize the texture picture and the depth picture of the view to be encoded to obtain a synthesized picture according to a reference view picture, and the hole filling technology is used to predict the hole region information and fill the hole of the synthesized picture of the view to be encoded to obtain a predicted picture, thus improving the efficiency of video encoding and improving the quality of encoding.

The present application also provides a computer-readable storage medium, storing computer-executable instructions for performing any one of the inter-view prediction method described according to FIG. 5.

The present application also provides an encoder including a memory for storing computer executable instructions and a processor, the instructions, when executed by the processor, cause the processor to perform any one of steps of the inter-view prediction method described according to FIG. 5.

Figure 7:
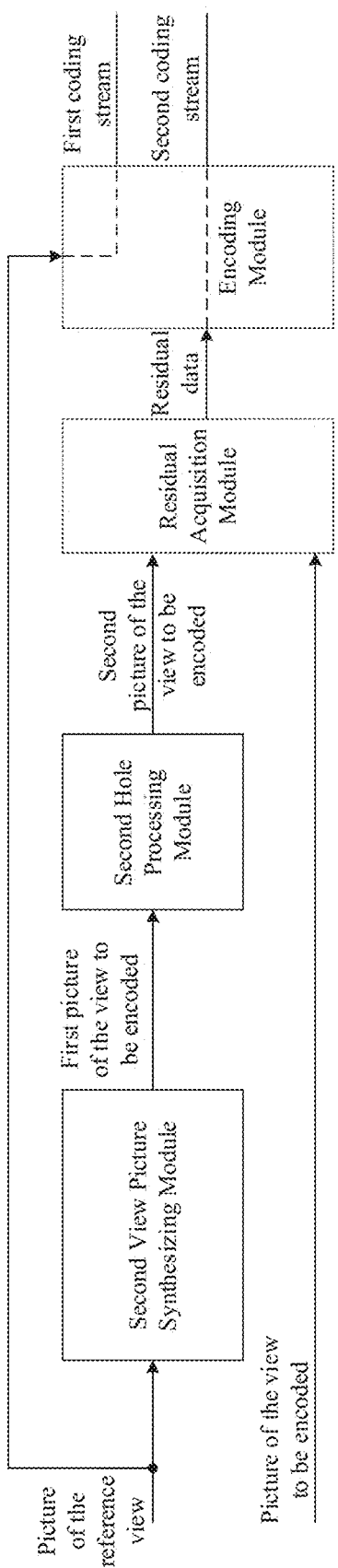
FIG. 7 is a schematic diagram of a composition structure of an encoder in an embodiment of the present application.

FIG. 7 is a schematic diagram of a composition structure of the encoder in an embodiment of the present application. As shown in FIG. 7, the encoder at least includes a second view synthesis module and a second hole processing module.

The second view picture synthesis module is configured to generate a first picture of a view to be encoded according to a picture of an encoded reference view taken at the same moment as a picture of the view to be encoded.

The second hole processing module is configured to fill a hole in the first picture of the view to be encoded according to relevant information of the generated first picture of the view to be encoded, to obtain a second picture of the view to be encoded.

In an example, the encoder of the present application may further include a residual acquisition module and an encoding module.

The residual acquisition module is configured to acquire residual data between the second picture of the view to be encoded and an original picture of the view to be encoded.

The encoding module is configured to encode the reference view picture to obtain a first coding stream, and encode the residual data to obtain a second coding stream.

In an example, the encoder of the present application may further include an acquisition module (not shown in FIG. 7).

The acquisition module is configured to acquire a texture picture of the reference view and a texture picture of the view to be encoded, and internal and external parameters of cameras corresponding to views, and estimate depth pictures corresponding to the views from the texture pictures.

Alternatively, the texture picture of the reference view and the texture picture of the view to be encoded, the depth pictures corresponding to the views and internal and external parameters of cameras corresponding to the views are obtained.

In an example, the second view picture synthesis module is specifically configured to generate a first picture of a view to be encoded according the texture picture of a picture of the encoded reference view taken at the same moment as a picture of the view to be encoded, the depth pictures corresponding to the views and the camera parameters corresponding to the views.

In an example, if the relevant information of the first picture of the view to be encoded includes texture picture information (denoted by T in the drawings), then, the second hole processing module is further configured to estimate depth picture information (denoted by D in the drawings) and/or mask picture information (denoted by M in the drawings) from the texture picture information.

In an example, if the relevant information of the first picture of the view to be encoded includes the texture picture information and depth picture information, then, the second hole processing module is further configured to predict mask picture information according to the texture picture information and the depth picture information.

In an example, the second hole processing module is specifically configured to: fill the hole in the first picture of the view to be encoded according to the texture picture information in the relevant information of the first picture of the view to be encoded, to obtain the second picture of the view to be encoded; or, fill the hole in the first picture of the view to be encoded according to the texture picture information and the depth picture information in the relevant information of the first picture of the view to be encoded, to obtain the second picture of the view to be encoded; or fill the hole in the first picture of the view to be encoded according to the texture picture information, the depth picture information and the mask picture information in the relevant information of the first picture of the view to be encoded, to obtain the second picture of the view to be encoded.

As shown in FIGS. 6(a) and 6(b), the second hole processing module is specifically configured to fill the hole in the first picture of the view to be encoded according to the texture picture information ($T'_1$) and the depth picture information ($D'_1$) to obtain the second picture of the view to be encoded; or fill the hole in the first picture of the view to be encoded according to the texture picture information ($T'_1$), the depth picture information ($D'_1$) and the mask picture information (M'), to obtain the second picture of the view to be encoded.

In an example, the second hole processing module is specifically configured to generate a hole peripheral availability template picture in the first picture of the view to be encoded.

As shown in FIG. 6(c), the second hole processing module is specifically configured to fill the hole in the first picture of the view to be encoded according to the texture picture information ($T'_1$), the depth picture information ($D'_1$), the mask picture information (M') and information of the hole peripheral availability template picture, to obtain the second picture of the view to be encoded.

In an example, the second hole processing module generates the hole peripheral availability template picture in the first picture of the view to be encoded in a manner including the following operations.

Connected regions composed of missing pixels are sequentially selected one by one from a mask picture of the hole.

A reference region (also called candidate pixels) that can be used for analyzing availability and located around the hole is acquired, to obtain the candidate pixels for analyzing availability.

Depth values of the obtained candidate pixels are analyzed, to obtain a depth threshold used to distinguish the depth values of the candidate pixels.

The depth picture for which hole filling is required to be performed is segmented using the depth threshold, to obtain the hole peripheral availability template picture.

In an example, the second hole processing module may be configured to fill the hole in the first picture of the view to be encoded using a neural network to obtain the second picture of the view to be encoded.

The encoder provided by embodiments of the application synthesizes a synthesized picture including a texture picture and a depth picture of the view to be encoded using the view synthesis technology according to a reference view picture, and predicts the hole region information and filling the hole of the synthesized picture of the view to be encoded using the hole filling technology, to obtain a predicted picture, thus improving the efficiency of video encoding and improving the quality of encoding.

Figure 8:
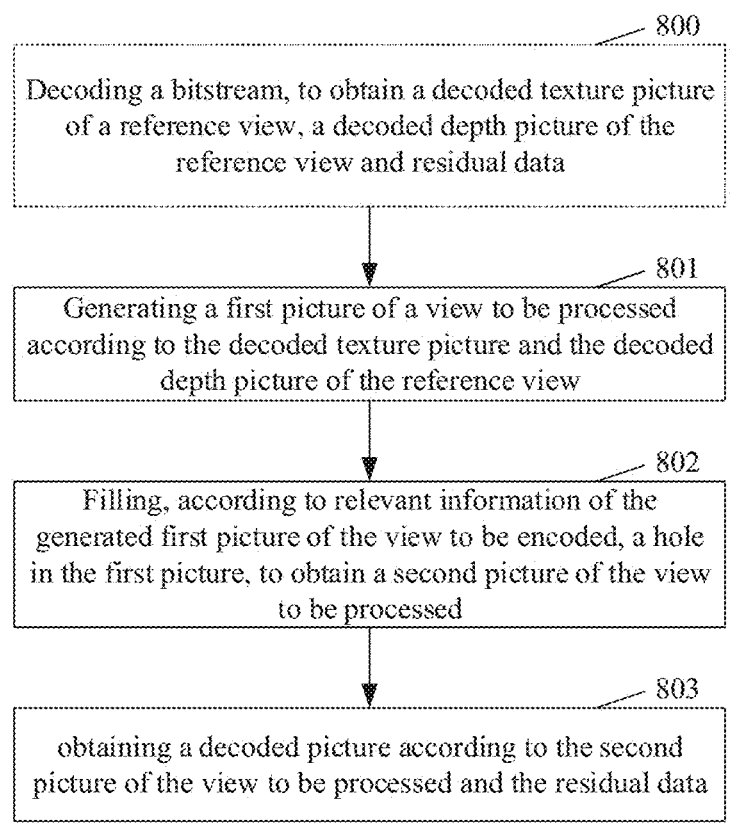
FIG. 8 is a flowchart schematically illustrating a decoding method in an embodiment of the present application.

FIG. 8 is a flow diagram of a decoding method in an embodiment of the present application. As shown in FIG. 8, the decoding method includes Operations 801-803.

In Operation 801, a first picture of a view to be processed is generated according to a texture picture and a depth picture of a reference view obtained by decoding.

In an example, before Operation 801, the method may include Operation 800.

In Operation 800, a bitstream is decoded, to obtain the decoded texture picture of the reference view, the decoded depth picture of the reference view and the residual data.

In an example, a first coding stream is decoded to obtain the decoded texture picture of the reference view and the decoded depth picture of the reference view. A second coding stream is decoded to obtain the residual data.

Decoding can be implemented in a decoding manner that conforms to common coding standards and corresponds to encoding, and the specific implementation is not limited.

In Operation 802, a hole in the first picture is filled according to relevant information of the generated first picture of the view to be encoded, to obtain a second picture of the view to be processed.

In an example, Operation 802 may include the following operations.

The hole in the first picture of the view to be processed is filled according to texture picture information ($\hat{T}'_1$) in the relevant information of the first picture of the view to be processed, to obtain the second picture of the view to be processed.

Alternatively, the hole in the first picture of the view to be processed is filled according to texture picture information ($\hat{T}'_1$) and depth picture information ($\hat{D}'_1$) for the first picture of the view to be processed, to obtain the second picture of the view to be processed.

Alternatively, the hole in the first picture of the view to be processed is filled according to texture picture information ($\hat{T}'_1$), depth picture information ($\hat{D}'_1$) and mask picture information ($\hat{M}'$) for the first picture of the view to be processed, to obtain the second picture of the view to be processed.

Alternatively, the hole in the first picture of the view to be processed is filled according to texture picture information ($\hat{T}'_1$), depth picture information ($\hat{D}'_1$), mask picture information ($\hat{M}'$) and information of hole peripheral available pixels for the first picture of the view to be processed, to obtain the second picture of the view to be processed.

In an example, hole filling may be performed for the entire processing unit or for partial region within the processing unit. In an example, the hole filling may further include one of a traditional diffusion-based method, a sample-based method, a network, etc.

In an example, before Operation 802, the method may include the following operation.

A hole peripheral availability template picture in the first picture of the view to be processed is generated.

The hole peripheral availability template picture includes a set of pixels which is located around the hole and of which pixel values can be referenced by pixels inside the hole.

In an example, the operation of generating a hole peripheral availability template picture in the first picture of the view to be processed may include the following operations.

Connected regions composed of missing pixels are sequentially selected one by one from a mask picture of the hole;

A reference region that can be used for analyzing availability and located around the hole is acquired, to obtain candidate pixels for analyzing availability;

Depth values of the obtained candidate pixels are analyzed, to obtain a depth threshold used to distinguish the depth values of the candidate pixels; and The depth picture for which the hole filling is required to be performed is segmented by using the depth threshold, to obtain the hole peripheral availability template picture.

In an example, Operation 802 may include the following operations.

The hole in the first picture of the view to be processed is filled, to obtain the second picture of the view to be processed by using a neural network.

In an example, the method further includes an operation that the neural network is implemented, which includes the following operations.

A texture picture for which the hole filling is required to be performed, a depth picture for the which hole filling is required to be performed, a mask picture of the hole and a hole peripheral availability template picture are cascaded, to obtain a preset number of channel tensors;

The obtained channel tensors are inputted into a convolution neural network for processing; and A filled texture picture is outputted.

In Operation 803, the picture of the view to be processed is restored according to the second picture of the view to be processed and the residual data.

The decoding method of the decoding end provided by embodiments of the present application is used in coordination with the inter-view prediction method of the encoding end provided by embodiments of the present application, thereby simply realizing video encoding/decoding, improving the efficiency of coding and decoding, and thus improving the quality of video coding and decoding.

The application also provides a computer-readable storage medium, storing computer-executable instructions for performing any one of the decoding method described based on FIG. 8.

The present application also provides a decoder including a memory for storing computer executable instructions and a processor, the instructions, when executed by the processor, cause the processor to perform any one of operations in the decoding method described based on FIG. 8.

Figure 9:
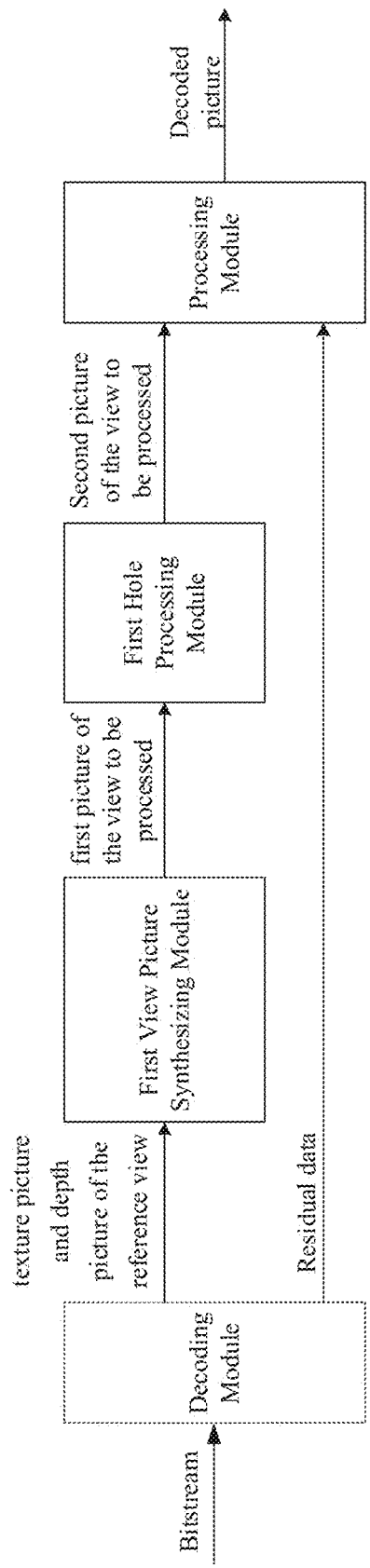
FIG. 9 is a schematic diagram of a composition structure of a decoder in an embodiment of the present application.

FIG. 9 is a schematic diagram of a composition structure of a decoder in an embodiment of the present application. The view synthesis technology adopted by the decoding end and the reference information and technology adopted in the hole filling are matched with that in the encoding end. As shown in FIG. 9, the decoder at least includes a first view synthesis module, a first hole processing module and a processing module.

The first view picture synthesis module is configured to obtain a first picture of a view to be processed according to a texture picture and a depth picture of a reference view.

The first hole processing module is configured to fill a hole in the first picture of the view to be processed according to relevant information of the first picture of the view to be processed, to obtain a second picture of the view to be processed.

The processing module is configured to restore the picture of the view to be processed according to the second picture of the view to be processed and residual data.

In an example, the decoder of the present application may further include a decoding module.

The decoding module is configured to decode a bitstream to obtain the decoded texture picture of the reference view, the decoded depth picture of the reference view and the residual data.

In an example, the first hole processing module may be specifically configured to: fill the hole in the first picture of the view to be processed according to texture picture information ($\hat{T}'_1$) in the relevant information of the first picture of the view to be processed; to obtain the second picture of the view to be processed; or fill the hole in the first picture of the view to be processed according to texture picture information ($\hat{T}'_1$) and depth picture information ($\hat{D}'_1$) in the relevant information of the first picture of the view to be processed, to obtain the second picture of the view to be processed; or fill the hole in the first picture of the view to be processed according to texture picture information ($\hat{T}'_1$), depth picture information ($\hat{D}'_1$) and mask picture information ($\hat{M}'$) in the relevant information of the first picture of the view to be processed, to obtain the second picture of the view to be processed; or fill the hole in the first picture of the view to be processed according to texture picture information ($\hat{T}'_1$), depth picture information ($\hat{D}'_1$), mask picture information ($\hat{M}'$) and information of hole peripheral available pixels in the relevant information of the first picture of the view to be processed, to obtain the second picture of the view to be processed.

In an example, the mask picture generation manners may include a variety of manners In an example, matched mask picture generation algorithms are used at the encoding end and the decoding end. In another example, a complex and fine mask picture generation algorithm is used at the encoding end, then the mask picture simply predicted and the residual value of the mask picture is transmitted; a simple and fast prediction method is used at the decoding end, then correcting operation is performed according to the residual value, and a more fine mask picture is obtained.

In an example, the first hole processing module is further configured to generate a hole peripheral availability template picture in the first picture of the view to be processed.

The hole peripheral availability template picture includes a set of pixels which is located around the hole and of which pixel values can be referenced by pixels inside the hole.

In an example, the first hole processing module generates the hole peripheral availability template picture in the first picture of the view to be encoded in a manner including the following operations.

Connected regions composed of missing pixels are sequentially selected one by one from a mask picture of the hole; a reference region that can be used for analyzing availability and located around the hole is acquired, to obtain candidate pixels for analyzing availability; depth values of the obtained candidate pixels are analyzed, to obtain a depth threshold used to distinguish the depth values of the candidate pixels; and the depth picture for which the hole filling is required to be performed is segmented by using the depth threshold, to obtain the hole peripheral availability template picture.

In an example, the first hole processing module may be specifically configured to fill the hole in the first picture of the view to be processed to obtain the second picture of the view to be processed by using a neural network.

In an example, the first hole processing module is further configured to implement the neural network in a manner including the following operations.

the texture picture for which hole filling is required to be performed, the depth picture for which hole filling is required to be performed, the mask picture of the hole and the hole peripheral availability template picture are cascaded to obtain a preset number of channel tensors; the obtained channel tensors are inputted into a convolution neural network for processing, and a filled texture picture are outputted.

The decoder provided by embodiments of the present application is used in coordination with the encoder provided by embodiments of the present application, thereby simply realizing video encoding/decoding, improving the efficiency of coding and decoding, and thus improving the quality of video coding and decoding.

According to embodiments of the application, the view synthesis technology is used to synthesize a synthesized picture including a texture picture and a depth picture of the view to be encoded according to a reference view picture, and the hole filling technology is used to predict the hole region information and fill the hole of the synthesized picture of the view to be encoded to obtain a predicted picture, so that the efficiency of video encoding/decoding and the quality of encoding/decoding are improved.

It will be apparent to those skilled in the art that the modules or operations of the present application described above may be implemented by a common computing device, they may be concentrated on a single computing device, or distributed over a network with multiple computing devices. Optionally, the modules or steps may be implemented with program code executable by the computing device, so that they may be stored in a storage device for execution by the computing device, and in some cases the operations shown or described may be performed in a different order with shown or described herein, either by fabricating them separately into individual integrated circuit modules or by fabricating multiple modules or steps of them into a single integrated circuit module. Thus the present application is not limited to any particular combination of hardware and software.

The above is only the specific embodiments of the disclosure, but the scope of protection of the disclosure is not limited to this. Various modifications and variations of the present application are knowable fore person skilled in the technical field. Any modification, equivalent replacement, improvement, etc. made within the spirit and principles of the present application shall be included in the scope of protection of the present application.

The invention claimed is:
1. A method for decoding, comprising:
generating a first picture of a view to be processed according to a texture picture and a depth picture of a reference view obtained by decoding;

filling, according to relevant information of the generated first picture, a hole in the first picture, to obtain a second picture of the view to be processed; and generating, according to the second picture and residual data between the second picture of the view to be processed and an original picture of the view to be processed, a decoded picture.

2. The method of claim 1, further comprising:

decoding a bitstream, to obtain the texture picture of the reference view, the depth picture of the reference view and the residual data.

3. The method of claim 1, wherein filling the hole in the first picture to obtain the second picture of the view to be processed comprises:

filling, according to texture picture information in the relevant information of the first picture of the view to be processed, the hole in the first picture of the view to be processed, to obtain the second picture of the view to be processed; or, filling, according to texture picture information and depth picture information in the relevant information of the first picture of the view to be processed, the hole in the first picture of the view to be processed, to obtain the second picture of the view to be processed; or, filling, according to texture picture information, depth picture information and mask picture information in the relevant information of the first picture of the view to be processed, the hole in the first picture of the view to be processed, to obtain the second picture of the view to be processed; or filling, according to texture picture information, depth picture information, mask picture information and information of hole peripheral available pixels in the relevant information of the first picture of the view to be processed, the hole in the first picture of the view to be processed, to obtain the second picture of the view to be processed.

4. The method of claim 1, further comprising: before filling the hole in the first picture, to obtain the second picture of the view to be processed, generating a hole peripheral availability template picture in the first picture of the view to be processed, wherein the hole peripheral availability template picture comprises a set of pixels which is located around the hole and of which pixel values can be referenced by pixels inside the hole.

5. The method of claim 4, wherein generating the hole peripheral availability template picture in the first picture of the view to be processed comprises:

selecting a connected region composed of missing pixels from a mask picture of the hole;

acquiring a reference region that can be used for analyzing availability and located around the hole, to obtain candidate pixels for analyzing availability;

analyzing depth values of the obtained candidate pixels, to obtain a depth threshold used to distinguish the depth values of the candidate pixels; and segmenting, using the depth threshold, a depth picture for which hole filling is required to be performed, to obtain the hole peripheral availability template picture.

6. The method of claim 1, wherein filling the hole in the first picture to obtain the second picture of the view to be processed comprises:

filling, using a neural network, the hole in the first picture of the view to be processed, to obtain the second picture of the view to be processed.

7. The method of claim 6, further comprising implementing the neural network in a manner of:

concatenating a texture picture for which hole filling is required to be performed, a depth picture for which hole filling is required to be performed, a mask picture of the hole and a hole peripheral availability template picture, to obtain a tensor with a preset number of channels;

inputting the obtained tensor into a convolution neural network for processing; and outputting a filled texture picture.

8. A decoder, comprising:

a memory for storing computer executable instructions; and a processor, wherein the processor is configured to execute the instructions to perform the following operations:

obtaining a first picture of a view to be processed according to a texture picture and a depth picture of a reference view;

filling, according to relevant information of the first picture of the view to be processed, a hole in the first picture of the view to be processed, to obtain a second picture of the view to be processed; and obtaining, according to the second picture of the view to be processed and residual data between the second picture of the view to be processed and an original picture of the view to be processed, a decoded picture.

9. The decoder of claim 8, wherein the processor is further configured to:

decode a bitstream to obtain the texture picture of the reference view, the depth picture of the reference view and the residual data.

10. The decoder of claim 8, wherein the processor is further configured to:

generate a hole peripheral availability template picture in the first picture of the view to be processed, wherein the hole peripheral availability template picture comprises a set of pixels which is located around the hole and of which pixel values can be referenced by pixels inside the hole.

11. The decoder of claim 8, wherein the processor is further configured to:

fill, using a neural network, the hole in the first picture of the view to be processed, to obtain the second picture of the view to be processed.

12. The decoder of claim 11, the processor is further configured to implement the neural network in a manner of:

concatenating a texture picture for which hole filling is required to be performed, a depth picture for which hole filling is required to be performed, a mask picture of the hole and a hole peripheral availability template picture, to obtain a tensor with a preset number of channels;

inputting the obtained tensor into a convolution neural network for processing; and outputting a filled texture picture.

13. An encoder, comprising:

a memory for storing computer executable instructions; and a processor, wherein the processor is configured to execute the instructions to perform the following operations:

generating a first picture of a view to be encoded according to a picture of an encoded reference view taken at a same moment as a picture of the view to be encoded;

filling, according to relevant information of the generated first picture of the view to be encoded, a hole in the first picture of the view to be encoded, to obtain a second picture of the view to be encoded; and acquiring residual data between the second picture of the view to be encoded and an original picture of the view to be encoded, for encoding.

14. The encoder of claim 13, wherein the processor is further configured to:

encode the picture of the reference view to obtain a first bitstream, and encode the residual data to obtain a second bitstream.

15. The encoder of claim 13, wherein the processor is further configured to:

acquire a texture picture of the reference view, a texture picture of the view to be encoded, and internal and external parameters of cameras corresponding to views, and estimate depth pictures corresponding to the views from texture pictures; or acquire a texture picture of the reference view, a texture picture of the view to be encoded, depth pictures corresponding to views and internal and external parameters of cameras corresponding to the views.

16. The encoder of claim 13, wherein the processor is further configured to:

fill, according to texture picture information in the relevant information of the first picture of the view to be encoded, the hole in the first picture of the view to be encoded to obtain the second picture of the view to be encoded; or, fill, according to texture picture information and depth picture information in the relevant information of the first picture of the view to be encoded, the hole in the first picture of the view to be encoded to obtain the second picture of the view to be encoded; or fill, according to texture picture information, depth picture information and mask picture information in the relevant information of the first picture of the view to be encoded, the hole in the first picture of the view to be encoded to obtain the second picture of the view to be encoded.

17. The encoder of claim 13, wherein the processor is further configured to:

generate a hole peripheral availability template picture in the first picture of the view to be encoded, wherein the hole peripheral availability template picture comprises a set of pixels which is located around the hole and of which pixel values can be referenced by pixels inside the hole, and fill, according to a texture picture, a depth picture, a mask picture and the hole peripheral availability template picture, the hole in the first picture of the view to be encoded to obtain the second picture of the view to be encoded.

18. The encoder of claim 17, wherein the processor is further configured to:

select connected regions composed of missing pixels one by one from a mask picture of the hole sequentially;

acquire a reference region that can be used for analyzing availability and located around the hole, to obtain candidate pixels for analyzing availability;

analyze depth values of the obtained candidate pixels, to obtain a depth threshold used to distinguish the depth values of the candidate pixels; and segment, using the depth threshold, a depth picture for which hole filling is required to be performed, to obtain the hole peripheral availability template picture.

19. The encoder of claim 13, wherein the processor is further configured to fill, using a neural network, the hole in the first picture of the view to be encoded to obtain the second picture of the view to be encoded.

20. The encoder of claim 19, wherein the processor is further configured to implement the neural network in a manner of:

concatenating a texture picture for which hole filling is required to be performed, a depth picture for which hole filling is required to be performed, a mask picture of the hole and a hole peripheral availability template picture, to obtain a tensor with a preset number of channels;

inputting the obtained tensor into a convolution neural network for processing; and outputting a filled texture picture.

* * * * *